United States Patent [19]

Campe

[11] 4,107,595
[45] Aug. 15, 1978

[54] CURRENT CONTROL SYSTEM FOR A STEPPING MOTOR

[75] Inventor: William T. Campe, Chicago, Ill.

[73] Assignee: Teletype Corporation, Skokie, Ill.

[21] Appl. No.: 762,065

[22] Filed: Jan. 24, 1977

[51] Int. Cl.² .............................................. H02K 29/04
[52] U.S. Cl. ................................... 318/696; 318/138; 318/254
[58] Field of Search ................ 318/696, 685, 254, 138

[56] References Cited

U.S. PATENT DOCUMENTS

| | | | |
|---|---|---|---|
| 3,368,128 | 2/1968 | Parrish | 318/138 |
| 3,441,821 | 4/1969 | Tomota et al. | 318/138 |
| 3,551,774 | 12/1970 | Rusch | 318/341 |
| 3,569,807 | 3/1971 | Ulrich | 318/308 |
| 3,624,474 | 11/1971 | Nolf | 318/331 |
| 3,826,966 | 7/1974 | Nagasaki et al. | 318/696 |
| 3,982,622 | 9/1976 | Bellino et al. | 197/1 R |

*Primary Examiner*—Herman J. Hohauser
*Attorney, Agent, or Firm*—W. G. Dosse; J. C. Albrecht

[57] ABSTRACT

A conventional stepping motor has an optical disk connected to its rotor. Optically generated pulses from the disk are used to generate a signal indicating the speed of the rotor. A code converter converts the speed signals into a binary-encoded power-required signal for feedback to control the power delivered to the coils of the stepping motor so as to maintain a constant stepping speed. The encoded power-required signal is delivered to a binary comparator which delivers an output pulse of one binary sense or the other. A clock driving a counter generates a binary count having the same number of binary levels as the encoded power-required signal fed to the comparator. The output of the counter is also fed to the comparator. The comparator delivers an output of one binary sense when the clock count is less than the binary-encoded power-required signal and an output of the other binary sense when the counter output is greater than the power-required signal. Therefore, the output of the comparator is essentially a square wave having a frequency equal to the frequency of the clock delivered to the counter divided by the count modulus of the counter. The output of the comparator is used to gate the drive signals of the stepping motor at a rate substantially higher than the normal stepping rate of the stepping motor and higher than the normal maximum audible frequency. Therefore, the stepping motor drive pulses are effectively chopped by the output of the comparator. The duty cycle of the chopped signal controls the ON versus OFF ratio and thus the power supplied to the stepping motor coils.

10 Claims, 4 Drawing Figures

4,107,595

CURRENT CONTROL SYSTEM FOR A STEPPING MOTOR

FIELD OF THE INVENTION

This invention relates to stepping motor drive circuits and more particularly to circuits for output and torque of a stepping motor.

BACKGROUND OF THE INVENTION

Stepping motors generally have either magnetically permeable rotors or permanent magnet rotors. Coils are generally mounted with their axes radially oriented around the rotor and fixed to the stator of the stepping motor. Customarily, several coils spaced about the stator are interconnected and energized simultaneously in order to position the rotor in a predetermined angular relationship with respect to these coils.

In a variable-reluctance-rotor stepping motor, torque is developed by the rotor until the rotor is positioned so as to minimize the air gap between the rotor and the stator core adjacent the energized coils. In a permanent magnet motor, the rotor moves so as to place a permanent magnet pole as close as possible to the opposite pole generated electromagnetically by an appropriate coil. Many sets of these coils can be positioned around the stator with each set energized in succession in order to advance the stepping motor by small angular increments or steps as one set of coils is de-energized and another set of coils is energized. In systems in which a stepping motor is driving a load such as the printing device disclosed in U.S. Pat. No. 3,982,622 granted on Sept. 28, 1976, to J. A. Bellino et al., that can have both inertial and friction loading, the stepping speed of the rotor resulting from energizing one set of coils after another is usually limited to a worse-case situation in order to prevent advancing the coil energization state so fast as to outpace the rotor of the stepping motor and thus cause the rotor to lose synchronism with the coils.

Due to the highly inductive nature of the stepping coils, motor torque control is difficult since a lower torque generally requires either lowering the voltage supplied to the stepping motor and its driver amplifiers or increasing resistance placed in series with the coils in order to limit the peak current through the coil. A high supply voltage is desirable for high energy concentration at inertial start-up of the motor yet overcurrent is not desired. In addition, the insertion of electrical resistance also shows inductive response by effectively dropping the voltage across the coil as coil current builds up.

Therefore, it is an object of the present invention to control the speed of a stepping motor.

It is another object of the present invention to control the power supplied to a stepping motor.

SUMMARY OF THE INVENTION

In accordance with the present invention, the power supplied to a multicoil set stepping motor and thus its rotor torque is controlled by chopping the phase control input signals to the motor with a chopping signal having an ON and OFF time which is controllable to zero and varying the proportion of ON time and OFF time of the chopped signal in accordance with the torque required at the stepping motor and gating the stepping motor driver amplifiers with the chopped signal.

BRIEF DESCRIPTION OF THE DRAWINGS

The present invention will be more clearly understood by referring to the following detailed description when considered in conjunction with the accompanying drawings wherein.

DETAILED DESCRIPTION

Figure 1:
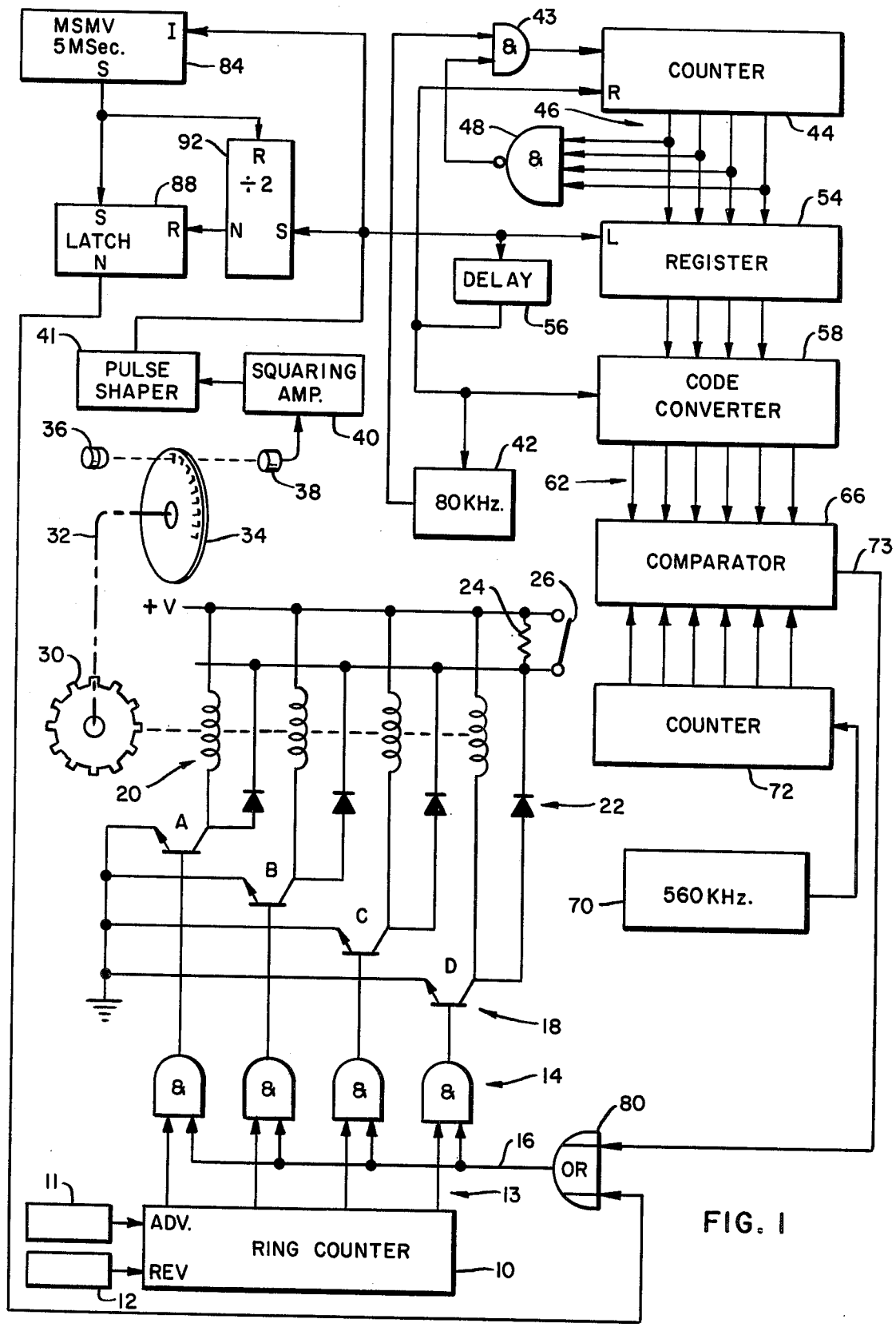
FIG. 1 is an overall schematic drawing of a stepping motor drive system including the control system of the present invention.

Referring now to the drawings and more particularly to FIG. 1, there is shown a conventional binary ring counter 10 which can typically operate bidirectionally with either of two types of control systems. In the first type of control system, advance pulses from a control 11 — which can be a manual interface — are supplied to the ADV input of the ring counter 10 to cause the ring counter 10 to advance in one direction; or pulses from a reverse control 12 — which can also be a manual interface — are supplied to the REV input of the ring counter 10 to cause the ring counter 10 to progress in the reverse direction. In the second type of control system, all advance pulses in either direction are applied to the ADV input, and the direction of advance of the ring counter is controlled by the binary state applied to the REV input.

Figure 2:
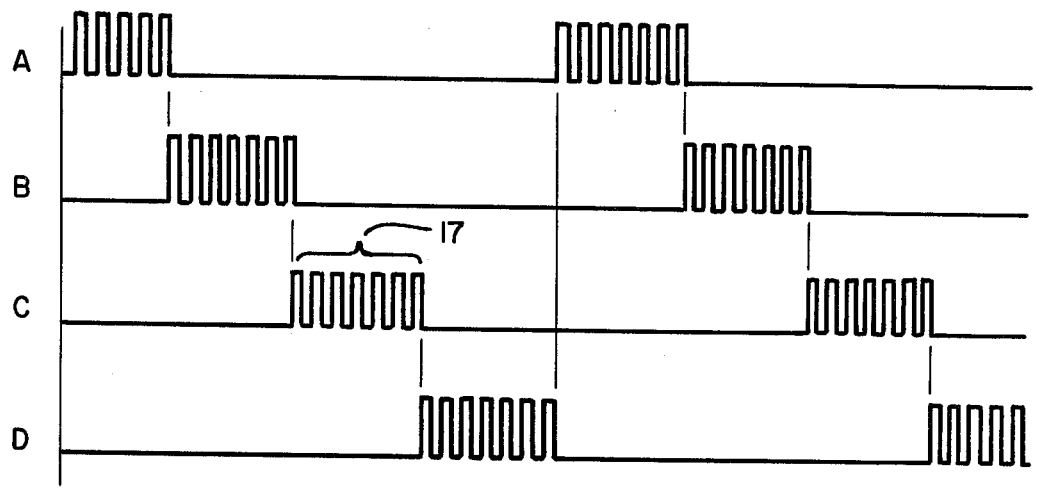
FIG. 2 is a series of waveforms representing typical stepping-motor energizing signals.

In either case, there are four outputs 13 from the ring counter 10, and only one counter output is normally energized at any given time. The outputs 13 are delivered to four AND-gates 14. The AND-gates 14 permit an energizing signal to pass whenever both inputs to the selected AND-gate 14 are energized. The second input to each of the four AND-gates 14 is provided on a chop control wire 16 which is described in detail hereinafter. At this point however, it is sufficient that the signal on the chop control wire 16 has a characteristic related to a power requirement. FIG. 2 shows typical signals derived from the AND-gates 14. The short duration square pulses are the result of the chopping signal on the chop control wire 16. Groups of short-duration chopping signals combine to form stepping-motor advance pulses such as the pulse 17.

The output of each of the four AND-gates 14 is delivered to the base electrode of an associated transistorized driver amplifier 18. While only one transistor is shown for driving each of four coil sets 20, it will be readily understood that more elaborate driver amplifiers are well-known to those skilled in the art. Each of the four coil sets 20 is shown as a single coil. Each of the four coils referred to by the reference number 20 is actually a single phase or set of coils of the stepping motor. The coil sets 20 are spaced around the periphery of the stator, and the coils of any given set can be connected in series or in parallel as the design of the specific stepping motor may require. Four clamping diodes 22 are oriented to be back-biased with a normal flow of current from a voltage supply +V and are arranged to shunt their associated coil sets 20 in order to prevent an inductively-generated turn-OFF transient or inductive kick from developing destructive voltages across the associated driver amplifiers 18. A resistor 24 in series with each diode 22 increases the maximum voltage that can be inductively generated by each coil set 20, in order to maximize the stepping speed permissible with the stepping motor. When the stepping motor is to be operated at a slow speed or under idle conditions, a switch 26 is closed to shunt the resistor 24 and thus slow the deenergization of each coil set whenever its associated driver amplifier 18 switches to the OFF condition. This is particularly helpful with a chopped drive pulse (see FIG. 2); because, the low-voltage diode clamping smooths the current resulting from a chopped drive signal.

The sequential energization of the stepping motor coil sets 20 under control of the ring counter 10 causes the stepwise rotation of the stepping motor rotor 30. In normal usage, some utilization device (not shown) is connected to the shaft of the stepping motor which is schematically depicted by the dashed line 32 and provides a load for the stepping motor. However, the load (not shown) forms no part of the present invention and has been omitted for clarity.

An optical disk 34 is mounted on the shaft 32 of the stepping motor for rotation therewith. The optical disk 34 is of the conventional type having alternate translucent and opaque areas arranged circumferentially about its periphery. The gradation of these translucent and opaque spots around the periphery of the disk 34 can be made very fine and close together. In fact it is preferred that as many as six or more translucent areas separated by opaque areas are arranged in the angular distance moved by the stepping motor in one step resulting from the deenergization of one coil set 20 and the energization of the succeeding coil set 20.

An optical sensor 38 located on one side of the optical disk opposite a light source 36 senses a light beam passing through the translucent portions of the optical disk 34. The output of the photosensor 38 is typically a series of pulses experiencing a transition in one direction when an optically opaque area blocks light from reaching the photosensor 38 and a transition to the opposite binary sense when a translucent area of the disk 34 intervenes between the light source and the photosensor 38. In a preferred implementation with a stepping motor, it will be expected that as many as 4,000 pulses per second would be received from the optical sensor 38. However, this is only a typical number and specific designs may be devised which could result in even more pulses per second.

Figure 3:
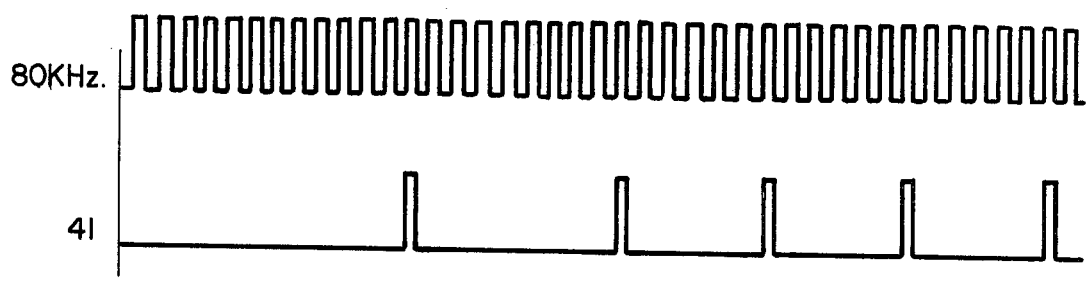
FIG. 3 is a waveform of the present circuit sensing the speed of an accelerating rotor.

The electrical pulse signals developed by the optical sensor 38 are delivered to a squaring amplifier 40 which can be typically a Schmitt trigger or comparable circuit for generating a series of pulses of very short rise time and fall time in response to an input signal that may have a rather slowly rising and slowly falling characteristic. Each sharp rise of the signal output from the squaring amplifier 40 represents the passage or angular movement of the rotor 30 through one unit of angular displacement. The output of the squaring amplifier 40 is essentially a square wave. A pulse shaper 41 receives the output of the squaring amplifier and, on each rising transition of the square wave signal, produces a pulse of very short duration. The pulses marked 41 in FIG. 3 illustrate the output pulses from the pulse shaper 41. A monostable multivibrator is the preferred form of the pulse shaper 41.

Several units of angular displacement (each unit represented by a pulse 41 of FIG. 3) constitute a single step of the stepping motor. FIG. 3 illustrates the pulses derived from the pulse shaper 41 as the rotor 30 accelerates. As will be evident from the following, FIGS. 2 and 3 do not have the same time base.

A clock 42, which is preferably a gated unijunction oscillator, generates pulses at approximately an 80 kilohertz rate (see FIG. 3) and delivers these pulses through a normally-enabled AND-gate 43 to a binary counter 44. The binary counter 44 has typically four outputs 46. While only four outputs 46 are shown from the binary counter 44, it will be recognized that it may be desirable to count more than sixteen pulses from the 80 kilohertz clock 42. Consequently, the counter 44 contains more than four counter stages; and the stages of the counter 44 that count the least significant binary bits may not be included in the outputs 46; but the outputs 46 are preferably derived from the most significant four stages of the binary counter 44. It will be recognized that with the exemplary frequencies indicated for the clock 42 and for the shaft pulse signals from the optical sensor 38, the binary counter 44 should have a capability of counting to more than 20 and preferably considerably more.

When the stepping motor first starts to move from a rest position, the number of pulses from the clock 42 that reach the counter 44 between successive pulses from the pulse shaper 41 may exceed the capacity of the counter 44. It is important that the counter 44 not be permitted to recycle to its initial condition lest it indicate a misrepresentative count. Therefore, each of the outputs 46 is connected as one input to a NAND-gate 48 (inverting-output AND-gate). When all four outputs 46 of the counter 44 are in the binary "1" condition, the counter 44 has attained its maximum possible count and is about to recycle or self-reset. At this point, the NAND-gate 48 removes the normally-enabled input of the AND-gate 43, and the counter 44 receives no additional increment pulses from the clock 42. Actually, the counter 44 could alternatively be stopped upon reaching the count that corresponds to maximum power applied to the stepping motor.

Each time the pulse shaper 41 issues an output signal (see FIG. 3), that signal is delivered directly to the load input of a storage register 54 which stores the four most significant bits then present at the output 46 of the counter 44.

Referring to FIG. 3, the shaft pulses from the squaring amplifier 40 have a period that is related to the speed of the shaft 32. Therefore, as the shaft 32 accelerates, the period is longer when the shaft is going more slowly and is shorter as the shaft 32 goes faster. When the shaft is rotating more slowly, the counter 44 counts more of the 80 Khz pulses between successive shaft pulses than can be counted when the shaft 32 is rotating faster.

The output from the pulse shaper 41 also passes through a brief delay 56 to reset the counter 44 to its initial condition. The duration of the delay 56 is not significant but must be long enough to assure that the contents of the counter 44 are suitably and properly transferred to the register 54 before resetting the counter 44. The delay 56 should be less than the period of the clock 42, thereby assuring that the next clock pulse from the clock 42 will be properly registered as the first count after reset of the counter 44.

The output of the delay 56 is also sent to the clock or oscillator 42 to synchronize the 80Khz clock pulses with the shaft position pulses from the pulse shaper 41. This synchronization is to assure that the counter 44 always starts counting with the same time, referenced to the shaft position pulses from the pulse shaper 41. While the rotor 30 is accelerating, such synchronization is relatively unimportant. However, when the rotor 30 is at the desired angular speed, it is desired that the counter 44 always count the same number of pulses between any two evenly-spaced shaft-position pulses. If there were no synchronization, that count could vary by one. Such variation would produce a corresponding variation in power supplied to the stepping motor. Variations in supplied power produce variations in speed. Such speed variations would be useless dither or hunting and are not desirable.

The outputs of the storage register 54 are delivered to the code inputs of a code converter 58. The output of the delay 56 is also used to trigger the operation of the code converter 58, should the nature of the specific code converter require a separate trigger to begin a cycle of operation.

As described in connection with FIG. 3, in the operation of the stepping motor according to the present system, if the shaft 32 and the rotor 30 are rotating at a very slow rate, the binary count reached by the counter 44 is a fairly high count, thereby indicating that a large amount of energy should be applied to the motor in order to generate more torque so as to speed up the rotor 30. However, if the rotor 30 is going at a high speed, the count that is contained in the counter 44 is relatively low, thereby indicating that a low amount of energization should be supplied to the coil 20 of the stepping motor 30. The purpose of the code converter 58 is to convert in a more or less straightforward way the output from the storage register 54 into a torque requirement signal at a plurality of outputs 62 which will determine the amount of energy supplied to the coil 20 of the stepping motor.

It will be recognized that the actual code conversion operation is entirely arbitrary in that the use to which the stepping motor is put will dictate what pulse count stored in the register 54 will result in what energy requirement signal present on the outputs 62 of the code converter 58. It will be recognized that diode-gating code conversion is extremely useful in the code converter 58. Also, a read-only memory (ROM) can readily be used as the code converter 58. Even a stored-program controller with a straightforward look-up table program can be used. The address input to the read-only memory comprises the outputs from the storage register 54, and the outputs derived from the read-only memory then comprises the outputs 62. Whatever form of code conversion is used in the code converter 58, each unique binary permutation of the outputs from the storage register 54 results in a unique permutation of the outputs 62 in a multilevel binary code. Consequently, the four levels of binary signals that constitutes the output of the storage register 54 represents 16 unique permutations. These sixteen unique permutations are arbitrarily converted by the code converter 58 into 16 unique permutations of the outputs 62 from the code converter 58. These 16 permutations of the outputs 62 represent 16 power levels (some of which may be duplicates) that are to be supplied to an energized coil 20 of the stepping motor. While it is well recognized that six outputs 62 are shown emanating from the code converter 58 and that six binary levels are capable of representing 64 unique permutations; only 16 permutations are preferably employed in the present exemplary embodiment and the other 48 permutations are ignored.

A scale of 64 counts is desired for other circuit operation described hereinafter. Therefore, six outputs 62 are desired. However, sixteen different levels of power supplied to the motor is an adequately fine gradation of power.

Figure 4:
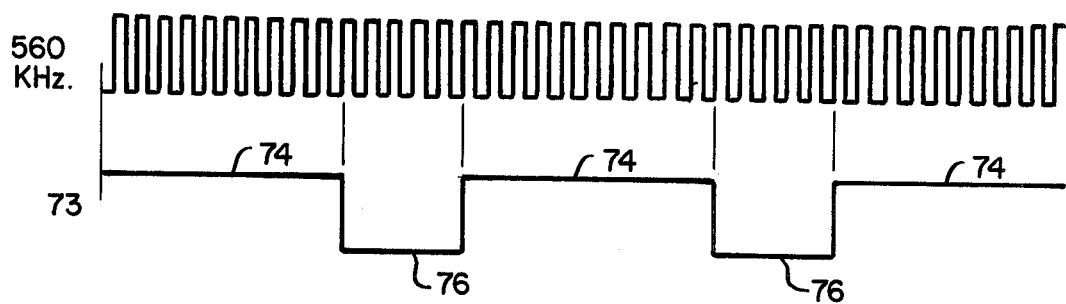
FIG. 4 illustrates the generation of a typical chopped drive signal illustrated in FIG. 2.

The outputs 62 from the code converter 58 are supplied to one input side of a comparator 66. A 560 kilohertz clock 70 delivers clock pulses to a six-stage binary counter 72. The 560Khz clock signal is depicted in FIG. 4, which does not have the same time base as either FIGS. 2 or 3. The binary counter 72 is arranged so that it will not recycle or reset after 64 clock pulses but will reset itself to its initial or zero condition after counting 38 of the 560Khz clock pulses. Consequently, the counter 72 resets itself 20,000 times per second (which is higher than the usual audible frequency range). Because a motor tends to magnetostrictively "sing" at its frequency of excitation, it is desired to have that frequency outside of the human-audible range in order to obtain a quieter machine.

The output of each of the six stages of the binary counter 72 is delivered to the other input side of the comparator 66. The comparator 66 compares, at each instant, the code permutation present on the output 62 with the six-bit code permutation on the outputs of the counter 72. If the binary count represented by the permutation on the outputs 62 is greater than the binary count represented by the permutation of signals on the outputs of the counter 72, the output 73 of the comparator is in a first binary state (for example, binary "1") (see level 74 of lower wave 73 in FIG. 4). However, whenever the binary count represented by the output from the counter 72 is greater than the binary count represented by the permutation of the signal present on the output 62, the output 73 of the comparator 66 is in the other binary condition (for example, binary "0"). (See level 76 of lower wave 73 in FIG. 4.)

Consequently, the binary signal train present at the output 73 comprises a square wave having a frequency corresponding to the cycling or recycling rate of the counter 72 which equals 20 kilohertz. The duty cycle or ON time (level 74) versus OFF time (level 76) of the square wave at the output 73 is controlled by the binary count representation present on the outputs 62 from the code converter 58, which is in turn controlled by the count stored in the storage register 54. As an example, each change from level 76 to level 74 in FIG. 4 might occur when the counter 72 resets. Each change from level 74 to level 76 would then occur when the code permutation on the outputs 62 equals the output of the counter 72. The waveform labelled "73" in FIG. 4 corresponds to a small portion of a phase pulse labelled 17 in FIG. 2 as combined in an AND-gate 14.

The comparator 66 can comprise AND-gate and OR-gate logic, a stored-program processing unit, or a 74C80 integrated circuit chip which is a standard in the industry and is available from National Semiconductor Corporation, Fairchild Semiconductor Corporation, or Texas Instruments Corporation.

The output 73 comprises a 20 kilohertz square wave signal (above the range of normal hearing) having an ON/OFF duty cycle representing the power level to be applied to the stepping motor 30. This square wave or chopped signal is delivered via an OR-gate 80 and the chop control wire 16 to the appropriate AND-gate 14 so as to chop or turn ON and OFF the ON controlled signal from the ring counter 10 (see exemplary chopped pulse 17 of FIG. 2). Consequently, the associated driver amplifier 18 turns ON and OFF at a 20 kilohertz rate to supply an average energy level to its associated coil set 20 which is less than the energy which would be supplied to that coil set with the associated driver amplifier 18 ON continuously while the stepping motor rotor is advancing to that coil set. For example, if the 20 kilohertz chopped signal had a duty cycle at 50%, i.e. ON half the time and OFF half the time, the energy supplied to the selected coil set 20 would be approximately one-half the maximum energy that would be supplied if the coil were energized continuously.

When the motor 30 first starts up after an idle period, the contents of the counter 44 may be undefined. During this initial period, it may be best to ignore the output 73 for a short time. Therefore, the OR-gate 80 is used to assure that the stepping-motor drive signals are not chopped if the shaft position signals from the pulse shaper 41 fail to occur less than about 5 milliseconds apart. Consequently, the pulses from the pulse shaper 41 are also delivered to the set input of a monostable multivibrator 84. Preferably this is an amplifier-driven or a unijunction monostable multivibrator with a zero reset interval, such as the SN74123 manufactured by Texas Instruments Corporation. In that class of monostable multivibrator, the inverse output changes from the stable, binary "1" state to the quasistable, binary "0" state whenever a set signal is received. The inverse output remains in the binary "0" state for the quasistable duration of the monostable multivibrator. If a second set signal is received before the end of the quasistable duration, the monostable multivibrator remains in the quasistable state for the full quasistable duration after the second set signal. Therefore, the monostable multivibrator will remain in its quasistable state indefinitely as long as the set signals that are received are separated by less than the quasistable duration.

Whenever the motor does not move by at least one unit for a 5-millisecond interval, the monostable multivibrator 84 is able to revert to its stable state. Its inverse output then becomes a binary "1" and sets a latch circuit 88 to the binary "1" condition. The normal output of the latch 88 is connected to the OR-gate 80 and the resultant binary "1" output from the OR-gate 80 assures that the motor drive signal will be unchopped until the latch 88 is reset.

The inverse output of the monostable multivibrator 84 is also delivered to the reset input of a divider circuit 92. When the monostable multivibrator 84 assumes its stable state, it resets the divider 92 as well as setting the latch 88.

As soon as the rotor 30 begins turning, the first shaft pulse from the pulse shaper 41 sets the monostable multivibrator 84 to its quasistable state which removes the set signal from the latch 88 and the reset signal from the divider 92. However, the latch 88 remains in its binary "1" state.

When the second shaft pulse is issued by the pulse shaper 41 less than 5 milliseconds later, the monostable multivibrator 84 remains in its quasistable state and the divider 92 sends a reset signal to the latch 88. When the latch 88 is reset, the binary "1" signal therefrom is removed from the OR-gate 80 and the chop control wire 16 responds to the chop signal at the output 73. By that time, the counter 44 is functioning to measure the speed of the rotor 30.

It will be seen from the above description that the velocity measurement of the rotor 30 is used in a feedback system to develop a power level demand signal at the output 62 which is used to generate a chopping signal at the chop control wire 16 for time modulating, at the gates 14, the drive signals supplied to the coil sets 20.

This chopping signal may degenerate into a 100% duty cycle or full ON condition when the stepping motor is at a low rate of speed. As the rotor 30 approaches the desired printing speed of the printer disclosed in the abovementioned Bellino et al. patent, the code converter 58 sends signals to the comparator 62 which reduce the duty cycle of the signal on the chop control wire 16 in order to reduce the power supplied to the stepping motor. This power level can be arbitarily controlled in the code converter 58 to minimize velocity overshoot and undershoot of the rotor 30.

Additionally, the average power level resulting from the chopped signal duty cycle is chosen such that at the desired printing speed, the stepping motor is running in its slew mode. These power level requirements are all easily determined on an empirical basis, and the code converter 58 is arranged accordingly by its wiring or programming according to whatever type of code converter is chosen.

Although only one specific embodiment of the invention is shown in the drawings, and described in the foregoing specification, it will be understood that invention is not limited to the specific embodiment described, but is capable of modification and rearrangement and substitution of parts and elements without departing from the spirit of the invention.

What is claimed is:

1. In a system for operating a stepping motor having a rotor and a stator with a plurality of individually-wound sets of phase coils for conducting electrical current, each set being individually energized by an associated driver-amplifier at a stepping rate in a predetermined sequence in order to advance the rotor, an improved circuit for controlling the output torque of the motor comprising:
   a source of pulses at a substantially uniform frequency substantially above the stepping rate and above the range of human hearing and having an ON time and an OFF time which may be controllable to zero;
   means for varying the proportion of the ON time and the OFF time of the pulses from the pulse source;
   means responsive to the torque required from the stepping motor for increasing the ON time of the pulses and decreasing the OFF time of the pulses when more torque is required and for decreasing the ON time of the pulses and increasing the OFF time of the pulses when less torque is required;
   means for turning OFF a driver-amplifier during the OFF times of the pulse source and allowing the driver-amplifier to be ON during the ON times of the pulse source;
   means for at least partially averaging the electrical current flowing in each individual set of phase coils between the ON time of its associated driver-amplifier and the OFF time of its associated driver-amplifier; and
   means for reducing the averaging effect during times when the driver-amplifiers are being energized in their predetermined sequence.

2. In a system for operating a stepping motor having a rotor and a stator with a plurality of individually-wound sets of phase coils for conducting electrical current, each set being individually energized by an associated driver-amplifier at a stepping rate in a predetermined sequence in order to advance the rotor, an improved circuit for controlling the output torque of the motor comprising:
- a source of pulses at a frequency substantially above the stepping rate and having an ON time and an OFF time which may be controlled to zero;
- means for varying the proportion of the ON time and the OFF time of the pulses from the pulse source;
- means responsive to the torque required from the stepping motor for controlling the varying means; and
- means for gating the driver-amplifiers with the pulses from the pulse source.

3. A system according to claim 2 wherein the controlling means comprises means for increasing the ON time of the pulses and decreasing the OFF time of the pulses when more torque is required and for decreasing the ON time of the pulses and increasing the OFF time of the pulses when less torque is required.

4. A system according to claim 2 wherein the pulses are at substantially a uniform frequency above the range of human hearing.

5. A system according to claim 2 wherein the gating means comprises means for turning OFF an energized driver-amplifier during the OFF times of the pulse source and allowing an energized driver-amplifier to be ON during the ON times of the pulse source.

6. A system according to claim 2 further comprising means for at least partially averaging the electrical current flowing in each individual set of phase coils between the ON time of its associated driver-amplifier and the OFF time of its associated driver-amplifier.

7. A system according to claim 6 further comprising means for reducing the averaging effect during times when the driver-amplifiers are being energized in their predetermined sequence.

8. A system according to claim 2 further comprising means for limiting the voltage applied to a driver-amplifier during a transition from an ON time to an OFF time; and means for varying the voltage limit between such times as the driver-amplifiers are energized in the predetermined sequence and such times as one driver-amplifier is energized to maintain the rotor in a stationary position.

9. An improved method of driving at a stepping rate a stepping motor having a plurality of windings each operated by an individually-associated switch each switch controlled by an associated switch-operating means to operate in a predetermined sequence, wherein the improved method includes the steps of:
- generating a series of chopping pulses having a frequency substantially above the stepping rate and above the human-audible range and an ON-vs.-OFF duty cycle;
- gating with the series of chopping pulses the control of each switch by its associated switch-operating means; and
- varying the torque of the motor by varying the duty cycle of the pulses.

10. In a system for operating a stepping motor having a rotor and a stator with a plurality of individually-wound sets of phase coils for conducting electrical current, each set being individually energized by an associated driver-amplifier in a predetermined sequence in order to advance the rotor by one unit increment each time the energization of the driver-amplifier is incremented in the predetermined sequence, and apparatus for controlling the output torque of the motor including: means for generating a plurality of shaft pulses evenly spaced with respect to the angular position of the rotor and within one unit increment of rotor rotation, said shaft pulses occurring at a rate commensurate with the speed of rotation of the rotor, means for generating clock pulses at a rate substantially greater than the maximum rate at which shaft pulses are expected to be generated, means for counting the number of clock pulses generated between successive shaft pulses, and means responsive to the count for controlling amount of energy supplied by the driver-amplifiers to their associated coil sets, an improved circuit for controlling the amount of energy supplied by the driver-amplifiers to their associated coil sets comprising:
- a source of pulses having an ON time and an OFF time which may be controllable to zero;
- means for varying the proportion of the ON time and the OFF time of the pulses from the pulse source;
- means responsive to the torque required from the stepping motor for controlling the varying means; and
- means for gating the driver-amplifiers with the pulses from the pulse source.

* * * * *